(12) United States Patent
Deshaies

(10) Patent No.: US 7,051,676 B1
(45) Date of Patent: May 30, 2006

(54) ANIMAL WATER FEEDER AND FLOW CONTROL NOZZLE THEREFOR

(76) Inventor: Brian S. Deshaies, 60 Williamine Dr., Newton, NH (US) 03858

( * ) Notice: Subject to any disclaimer, the term of this patent is extended or adjusted under 35 U.S.C. 154(b) by 0 days.

(21) Appl. No.: 11/032,988

(22) Filed: Jan. 10, 2005

(51) Int. Cl.
*A01K 7/00* (2006.01)
(52) U.S. Cl. ............................ 119/75; 119/72.5
(58) Field of Classification Search .................. 119/72, 119/77, 78, 79, 80, 75, 72.5, 51.5, 464, 475; 251/339, 298, 301, 303
See application file for complete search history.

(56) References Cited

U.S. PATENT DOCUMENTS

| | | | | |
|---|---|---|---|---|
| 3,529,575 A | * | 9/1970 | Schalk | 119/72.5 |
| 3,771,496 A | * | 11/1973 | Atchley | 119/72.5 |
| 4,258,666 A | * | 3/1981 | Edstrom | 119/72.5 |
| 5,044,320 A | | 9/1991 | Le Roy | |
| 5,193,485 A | * | 3/1993 | Hostetler | 119/72.5 |
| 5,363,802 A | * | 11/1994 | Huff | 119/475 |
| 5,494,000 A | | 2/1996 | Tanabe | |
| 5,522,346 A | | 6/1996 | Clark, IV | |
| 6,050,445 A | | 4/2000 | Manganiello | |
| 6,293,226 B1 | * | 9/2001 | Hwang | 119/72 |
| 6,553,937 B1 | * | 4/2003 | Cheng | 119/72.5 |
| 6,810,830 B1 | * | 11/2004 | Cheng | 119/72.5 |

* cited by examiner

*Primary Examiner*—T. Nguyen
(74) *Attorney, Agent, or Firm*—Gregory J. Nelson

(57) ABSTRACT

An animal water feeder having an improved flow control nozzle. The flow is controlled by the animal engaging a movably confined ball at the terminus of the nozzle. A portion of the ball is exposed. The nozzle assembly includes a tube extending downwardly from the feeder. The tube includes a valve, an actuator having at least one water passage therein an engaging pin positioned adjacent thereto, and the ball. Movement of the ball opens the valve to release water which flows past the actuator to the terminus of the tube.

3 Claims, 3 Drawing Sheets

ANIMAL WATER FEEDER AND FLOW CONTROL NOZZLE THEREFOR

BACKGROUND OF THE INVENTION

This invention relates to an improved animal water feeder and a novel flow control nozzle used therewith.

The raising of animals in confinement, particularly poultry in cages, is today practiced throughout the world using techniques of mass production. Among the problems facing the operator of a large facility is the centralized distribution of water to the cages in the appropriate quantities without excessive or continual spillage. Maturing animals require different amounts of water during growth. Further, the growth rates of the animals being served may vary. Fixed centralized discharge systems are not responsive to the needs of individual animals. Furthermore, an excess water discharge has a tendency to pool and create an environment which is conducive to the spread of disease.

In an attempt to reduce the problems arising from the use of a central water distribution system, the use of localized distribution means serving one or a limited number of confined areas is utilized. Each animal being served activates a dispensing nozzle to receive water. A valving mechanism associate with each nozzle controls in part the amount of water distributed and the effectiveness of the cessation of flow during the time of non-use. These devices have been generally ineffective in preventing dripping during non-use due primarily to the change in mechanical characteristics of spring-biased valving over extended periods of use.

Typical individual water feeders presently in use have a closed or non-vented reservoir. The release of water from the closed container creates a reduced pressure therein leading to ever decreasing flow rates. Furthermore, changes in ambient conditions affect the internal pressure and result in variable flow rates. In addition, the use of sealed reservoirs require that the water feeder be removed from the cage, inverted and the nozzle removed to clean and refill the device. In facilities housing thousands of animals, this sequence of steps can take a long time involving the expenditure of many man-hours.

Accordingly, the present invention is directed to the provision of an improved water feeder having a novel feeding nozzle that essentially eliminates fluid leakage. In addition, the present water feeder utilizes a vented reservoir thereby avoiding the problems arising from the creation of reduced pressure in a sealed container. The novel feeding nozzle permits the flow rate to be modified to suit the particular application. Since the flow rate can be established and maintained during distribution of the contents of the container, the energy expended by the animal in extracting a given quantity of fluid is essentially constant.

SUMMARY OF THE INVENTION

The water feeder which is the subject of the present invention comprises a reservoir having an intake port and a discharge port therebelow. The reservoir can be received in a wire hanger for attachment to the wall of a cage, or alternatively, clamped means can be employed. The intake port is used to refill the reservoir and serves to vent the reservoir thereby maintaining the internal pressure at the ambient level.

An elongated tube is attached at the discharge port of the reservoir and is positioned so as to be accessible to the animal being supplied. The tube has a water passage extending therethrough to a free end. A flow control valve is located in the tube proximate to the discharge port. The nozzle assembly further includes an actuator positioned within the water passage and capable of axial movement therein. One end of the actuator is located adjacent to the flow control valve.

A discharge control member is movably retained in the free end. The control member extends into the opening at the free end of the tube and is accessible to the animal in the cage. A retention tip having an opening therein is located at the free end to engage the discharge control member when the device is not in use. Movement imported to the discharge control member, for example pressure exerted by the mouth or tongue of an animal or by the pecking thereof by a beak, causes the control number to become unseated in the retention tip allowing the passage of fluid.

The movement of the discharge control member causes the actuator to move and to contact the valve whereupon the valve is opened and fluid exits the reservoir. The actuator is provided with one or more fluid passages along its length. The fluid in the passages is conveyed to the free end of the tube and is available to the animal. The cessation of contact between the animal and the discharge control member results in the actuator returning to the reset position and the valve to close thereby terminating the flow of the fluid into the passage. The discharge control member is retained by the retention tip. However, flow therearound continues until the fluid exits from the passage. Since the reservoir is vented, the flow rate does not significantly vary with differing levels in the reservoir and a partial vacuum within the reservoir does not develop.

The present invention provides an essentially drip-free feeder that delivers fluid at a uniform rate in response to activation by the animal being served. The use of a reservoir having an intake port enables the reservoir to be refilled without decoupling from the wall of the animal cage. The flow rate of fluid and the effort extended by the animal to activate the device can be customized by the selection of the actuator and the valve.

Further features and advantages will become more readily apparent from the following detailed description of the preferred embodiment when viewed in conjunction with the accompanying drawings.

DESCRIPTION OF THE PREFERRED EMBODIMENT

Figure 1:
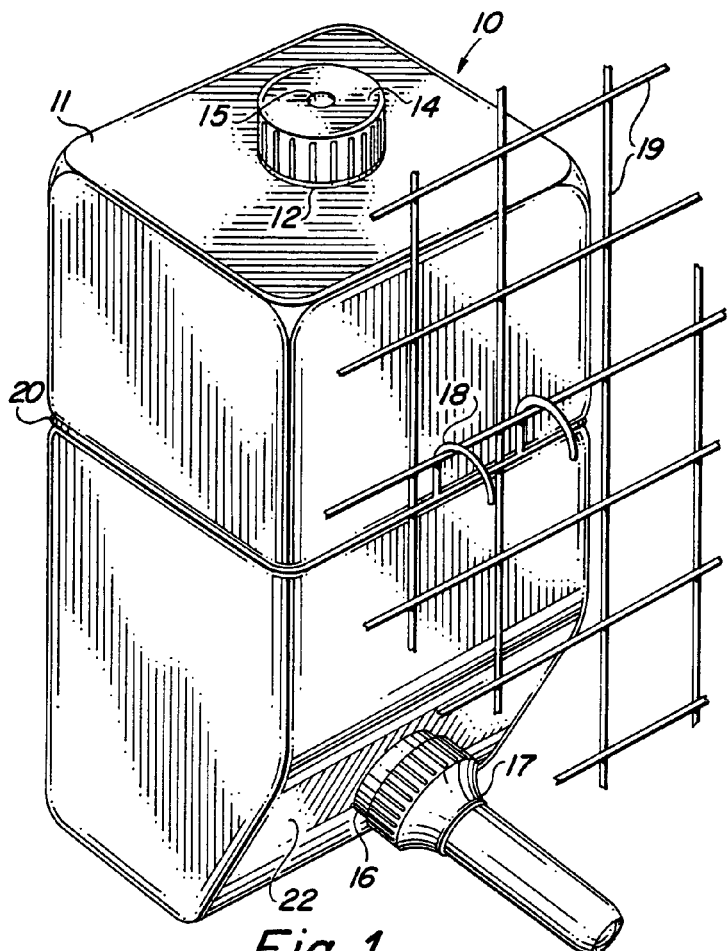
FIG. 1 is a view in perspective of the preferred embodiment of the invention supported on the wall of an animal cage.

Referring now to FIG. 1, the novel water feeder 10 includes a fluid reservoir 11 having an intake port 12 located on the top surface thereof. The intake port is threaded to receive cap 14 having a vent 15 therein. The feeder 10 is shown having a central encircling wire 20 about the middle of the reservoir. Wire 20 has a pair of hooks 18 adjacently spaced on one side of the reservoir for attachment to a wire 19 of the animal cage. When the feeder 10 is attached to the cage, the nozzle assembly 17 extends into the cage so as to be accessible to the animal therein.

The reservoir 11 is seen in FIG. 1 as having an angled lower region 22 containing discharge port 16 therein. The reservoir can utilize containers of varying shapes depending in part on the dimensions and configuration of the cage. In the embodiment show, the angled region 22 causes the nozzle assembly 17 to extend downwardly into the cage thereby improving access thereto by a caged animal. Further, the downward tilt aids in the flow of fluid through the nozzle assembly.

Figure 2:
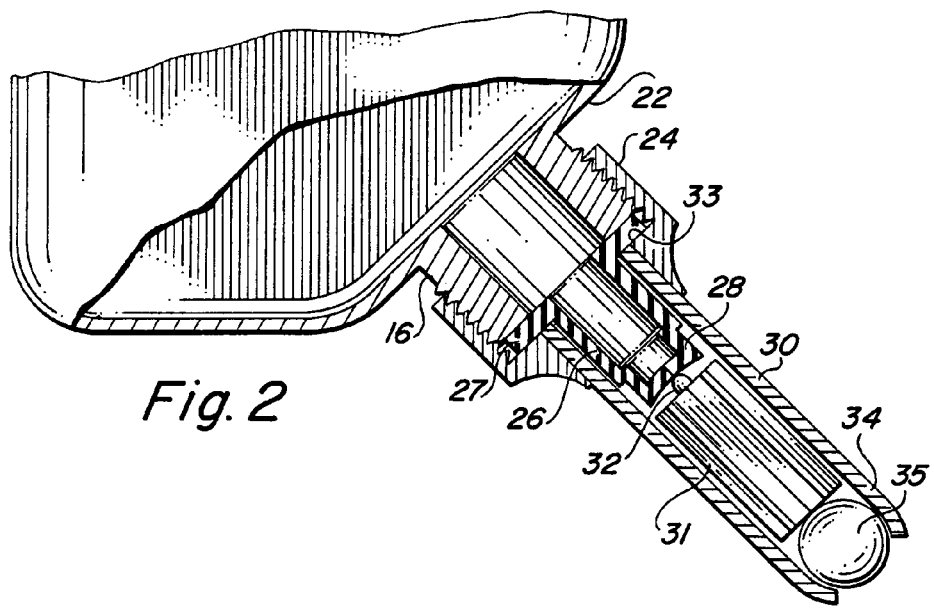
FIG. 2 is a view in cross-section of the nozzle assembly and discharge port of the embodiment of FIG. 1.
Figure 7:
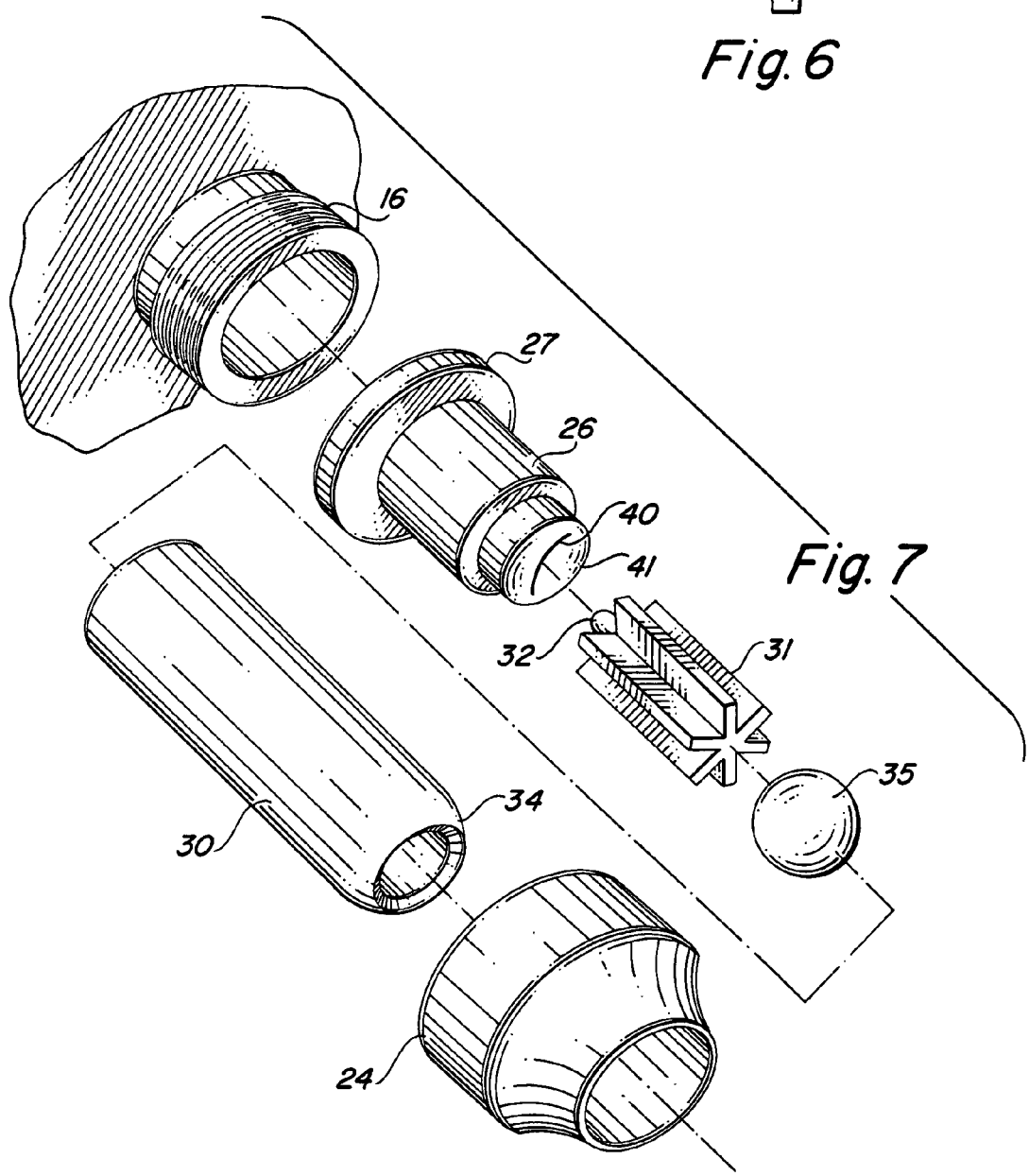
FIG. 7 is an exploded view showing the elements of the discharge nozzle of the embodiment of FIG. 1.

The details of the nozzle assembly are shown in the cross-sectional view of FIGS. 2 and 7 wherein the discharge port 16 located on angled region 22 of the reservoir is threaded to receive a mating tubular fitting 24. Typically, the reservoir and fitting 24 are manufactured of molded plastic. An elongated metallic sleeve 30 is received in fitting 24. The sleeve 30 is inwardly curved at the free end to form a retention tip 34 having a central opening. A metal ball 35 is movably retained in tip 34 with a portion thereof extending outwardly of the tip.

Figure 3:
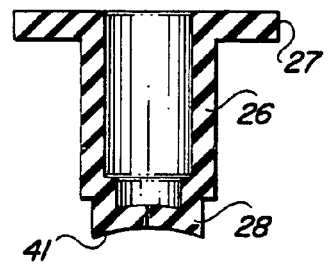
FIG. 3 is a view in cross-section of the valve used in the embodiment of FIG. 1.
Figure 4:
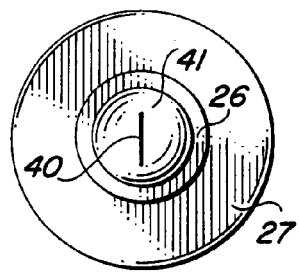
FIG. 4 is an end view of the valve shown in FIG. 3.

In the preferred embodiment, a washer 27 is interposed between the discharge port 16 and the shoulder 33 of fitting 24. The washer provides a seal between the adjacent threaded parts. A cylindrical section 26 having an upper flanged end forming washer 27 extends downwardly in sleeve 30 and is provided with the flow control member of valve 28 at the lower end. The cylindrical section includes the washer, valve and straight section therebetween and is preferably formed as a single part of molded elastomeric material. The part is shown in further detail in FIGS. 3 and 4 wherein a slit 40 extends through the valve end 41. The valve is normally closed as shown in FIG. 3. In the preferred embodiment, the valve end is inwardly curved to aid in effecting a seal. The weight of water against the curved end 41 urges the edges of slot 40 toward each other in sealing engagement.

An actuator 31 having an engaging pin 32 positioned adjacent the valve end 41 is movably contained within the water passage in sleeve 30. The opposing end of the actuator rests against the ball 35. When the ball is moved, the actuator moves to cause the engaging pin 32 to contact the valve end 41. The contact results in the edges of the slit 40 separating to pass fluid. The valve, termed a diaphragm valve, opens when pressure is applied to one or both sides of the slit 40. Since the actuator diameter is made to approximate the inside diameter of sleeve 30, the movement of the actuator is essentially along the axis of the sleeve and the position of the pin remains centered on the valve end.

The tubular sleeve is provided with a retention tip 34 that receives the discharge control member 35 thereagainst. The member 35 is a metal ball having a diameter of the opening in the retention tip. As a result, the animal can urge the ball inwardly thereby imparting movement to the actuator. The pin 32 on the actuator contacts the valve end 41 to permit fluid to flow downwardly from the reservoir.

Figure 5:
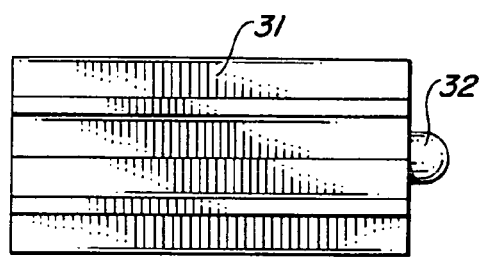
FIG. 5 is a side view of an actuator for use in the embodiment of FIG. 1.
Figure 6:
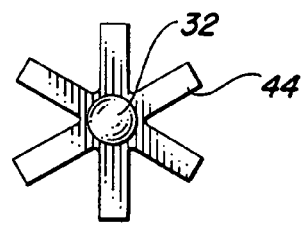
FIG. 6 is an end view of the actuator shown in FIG. 5.
Figure 8:
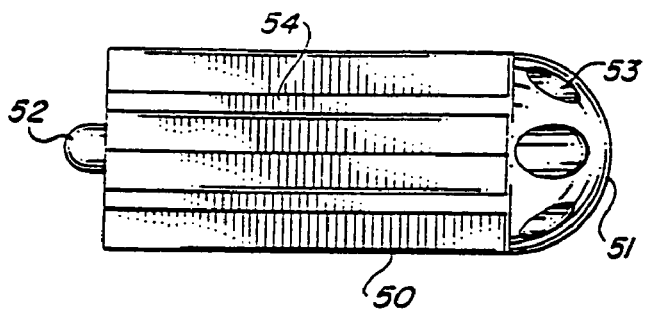
FIG. 8 is a side view of another actuator.
Figure 9:
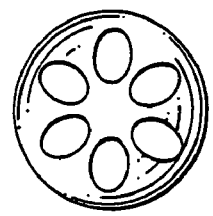
FIG. 9 is an end view of the actuator of FIG. 8.

The actuator 31 shown in FIGS. 5 and 6 is provided which a number of vanes 44 that extend radially outward to define a number of channels along with the fluid flows to the free end of sleeve 30. The actuator is preferably formed of molded plastic. Different configurations of the actuators can be used in the sleeve. An alternate embodiment is shown in FIGS. 8 and 9 wherein actuator 50 is formed with a rounded end 51 having a series of openings 53 therein. Each opening 53 communicates with a fluid passage formed between adjacent vanes 54. The rounded end 51 rests against the ball 35 in the retention tip 34. Movement of the ball along the axis of the sleeve results in an opening of the valve and a resultant flow of stored fluid.

Figure 11:
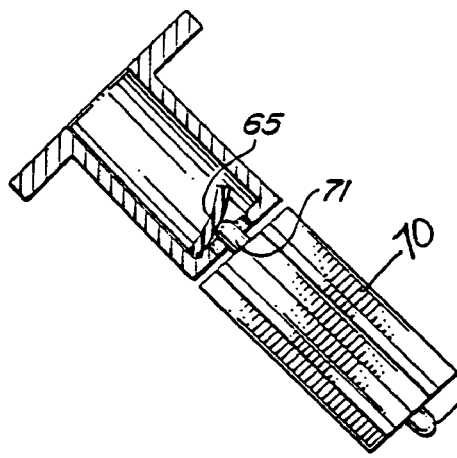
FIGS. 10 and 11 are views in cross-section showing another valve and actuator for use in the discharge nozzle.
Figure 10:
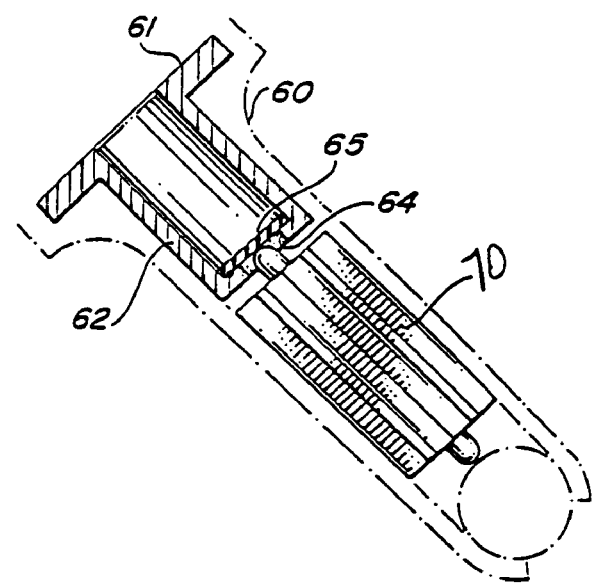

An alternate type of valve 60 is shown in FIGS. 10 and 11. The valve is formed of molded silicone rubber with a flanged washer 61 at one end and a central cylindrical section 62 dimensioned to fit within sleeve 30. An opening 64 is formed in the opposing end of the cylinder. A movable valve cover 65 is positioned over the opening 64 and movably secured at one edge to the cylinder wall. In the embodiment shown, the actuator 70 is provided with a pin 71 at each end. Movement of the actuator causes the pin adjacent to the valve cover to raise the cover and permit fluid to flow as shown in FIG. 11. When the animal ceases applying force to the ball in the retention tip, the actuator returns to the position shown in FIG. 10 and the valve is urged closed by the pressure applied by the fluid in the reservoir.

The configuration of the actuator 31 and the characteristics of the flow control valve primarily determine the flow rate when the discharge control member 35 is urged inwardly. One use of the present invention is directed to caged animals wherein the member 35 is moved by the mouth or beak of the animal. In other applications in which different types of animals apply greater forces of longer duration, different actuators can be used for limiting flow rates. In any case, the absence of a force applied to member 35 causes the member to be received in the retention clip and the actuator is withdrawn from contact with the valve. The discharge control member 35 and sleeve are preferably made of stainless steel since these two parts are subject to abuse by the caged animals. However, durable molded plastic parts can be used if desired.

While the foregoing description has referred to a specific embodiment of the invention, it is to be noted that modifications and variations may be made therein without departing from the scope of the invention as claimed.

What is claimed is:

1. A water feeder for delivering water upon user activation, said feeder comprising:
    (a) a reservoir having an intake port and a discharge port therebelow;
    (b) a tube attached to the discharge port of the reservoir and having a free end, said tube having a passage extending therethrough;
    (c) single flow control valve located in the tube proximate to the discharge port, said flow control valve having a diaphragm flow control surface and a slit extends through said diaphragm flow control surface; wherein said slit defines a normally closed flow blocking position and an open flow position;
    (d) an actuator movably contained within said passage, said actuator having an engaging pin thereon positioned adjacent to the valve diaphragm flow control surface;
    (e) a retention tip located at the free end of the tube and having an opening therein; and
    (f) a discharge control member movably received in the retention tip and extending into the opening therein, the movement of the discharge control member causing the actuator to contact the valve diaphragm flow control surface and thereby moving said normally closed flow blocking position to said open flow position whereby fluid passes across the valve and enters the passage and exits at the retention tip.

2. A water feeder for delivering water upon user activation, said feeder comprising:
  (a) a reservoir having an intake port and a discharge port therebelow;
  (b) a tube removably attached to the discharge port of the reservoir and having a free end, said tube having a passage extending therethrough;
  (c) a flow control valve located in the tube proximate to the discharge port, said valve including a cylindrical section dimensioned to fit within the tube, said cylindrical section having an upper end and a lower end, said upper end including a flange secured between the discharge port of the reservoir and the tube and the lower end including a flap hinged to the cylindrical section and having a normally closed position;
  (d) a retention tip located at the free end of said tube, said retention tip having an opening with inwardly curved edges;
  (e) an actuator movably contained within said passage, said actuator comprising an elongated rod defining a flow path for flow of water from the valve to the retention tip having an engaging end for imparting movement to the flaps and opening said valve; and
  (f) a discharge control member comprising a ball which extends into said tube opening, said ball having a diameter greater than the diameter of said opening, the movement of the ball causing the actuator end to contact the valve whereby fluid enters the passage and exits at the retention tip.

3. A water feeder for delivering water upon user activation, said feeder comprising:
  (a) a reservoir having an intake port and a discharge port therebelow;
  (b) a tube removably attached to the discharge port of the reservoir and having a free end, said tube having a passage extending therethrough;
  (c) a flow control valve located in the tube proximate to the discharge port, said valve including a cylindrical section dimensioned to fit within the tube, said cylindrical section having an upper end and a lower end, said upper end including a flange secured between the discharge port of the reservoir and the tube and the lower end comprising a slotted end having mating contact surfaces and having a normally closed position;
  (d) a retention tip located at the free end of said tube, said retention tip having an opening with inwardly curved edges;
  (e) an actuator movably contained within said passage, said actuator comprising an elongated rod defining a flow path for flow of water from the valve to the retention tip having an engaging end for imparting movement to the contact surfaces and opening the valve; and
  (f) a discharge control member comprising a ball which extends into said tube opening, said ball having a diameter greater than the diameter of said opening, the movement of the ball causing the actuator end to contact the mating contact surface whereby fluid enters the passage and exits at the retention tip.

* * * * *